(12) United States Patent
Hilmas et al.

(10) Patent No.: US 6,355,338 B1
(45) Date of Patent: Mar. 12, 2002

(54) CONTINUOUS COMPOSITE COEXTRUSION METHODS, APPARATUSES, AND COMPOSITIONS

(75) Inventors: Gregory E. Hilmas; Dustin R. Beeaff, both of Rolla, MO (US); Anthony C. Mulligan, Tucson, AZ (US); Mark M. Opeka, Laurel, MD (US); Mark J. Rigali, Tucson, AZ (US); Manish P. Sutaria, Philadelphia, PA (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 09/488,868

(22) Filed: Jan. 21, 2000

Related U.S. Application Data

(60) Provisional application No. 60/116,771, filed on Jan. 22, 1999.

(51) Int. Cl.[7] ................................................ B32B 25/02
(52) U.S. Cl. ................................ 428/297.1; 428/299.1; 501/94; 501/95; 264/63; 264/64; 264/65; 264/66
(58) Field of Search .................... 501/95, 94; 264/64, 264/63, 65, 66; 428/297.1, 299.1

(56) References Cited

U.S. PATENT DOCUMENTS

| | | | |
|---|---|---|---|
| 5,024,978 A | | 6/1991 | Allaire et al. |
| 5,250,243 A | * | 10/1993 | Allaire |
| 5,250,253 A | | 10/1993 | Allaire et al. |

* cited by examiner

Primary Examiner—Rich Weisberger
(74) Attorney, Agent, or Firm—Banner & Witcoff, Ltd.

(57) ABSTRACT

A process for continuous composite coextrusion comprising: (a) forming first a material-laden composition comprising a thermoplastic polymer and at least about 40 volume % of a ceramic or metallic particulate in a manner such that the composition has a substantially cylindrical geometry and thus can be used as a substantially cylindrical feed rod; (b) forming a hole down the symmetrical axis of the feed rod; (c) inserting the start of a continuous spool of ceramic fiber, metal fiber or carbon fiber through the hole in the feed rod; (d) extruding the feed rod and spool simultaneously to form a continuous filament consisting of a green matrix material completely surrounding a dense fiber reinforcement and said filament having an average diameter that is less than the average diameter of the feed rod; and (e) arranging the continuous filament into a desired architecture to provide a green fiber reinforced composite.

20 Claims, 3 Drawing Sheets

FIG. 8
SELF PROPAGATING, HIGH TEMPERATURE SYNTHESIS

FIG. 9

CONTINUOUS COMPOSITE COEXTRUSION METHODS, APPARATUSES, AND COMPOSITIONS

CROSS REFERENCE TO RELATED APPLICATION

This is an application under 35 U.S.C. Section 119(e) based upon a previously filed provisional application, Ser. No. 60/116,771 filed Jan. 22, 1999, which is incorporated herewith by reference, and which is co-pending, and which is believed to disclose adequately and sufficiently subject matter claimed herein.

This invention was made with U.S. Government support under SBIR grant Number N0022-C-4120 awarded by the Naval Sea Systems Command. Further description of the present invention is provided in the Report (dated Feb. 27, 1998), under contract N00024-97-C-4130, sponsored by the Naval Sea Systems Command. The Government has certain rights in the invention described herein.

BACKGROUND OF THE INVENTION

1. Technical Field of the Invention

The present invention relates to continuous composite coextrusion methods, apparatus for coextrusion, and compositions for preparing composites, such as continuous fiber reinforced ceramic matrix composites, using dense fibers and green matrices as well as to methods for the preparation of composites having interfaces between dense fibers and green matrices.

2. Background of the Invention

Composites are combinations of two or more materials present as separate phases and combined to form desired structures so as to take advantage of certain desirable properties of each component. The materials can be organic, inorganic, or metallic, and in various forms, including but not limited to particles, rods, fibers, plates and foams. Thus, a composite, as defined herein, although made up of other materials, can be considered to be a new material have characteristic properties that are derived from its constituents, from its processing, and from its microstructure.

Composites are made up of the continuous matrix phase in which are embedded: (1) a three-dimensional distribution of randomly oriented reinforcing elements, e.g., a particulate-filled composite; (2) a two-dimensional distribution of randomly oriented elements, e.g., a chopped fiber mat; (3) an ordered two-dimensional structure of high symmetry in the plane of the structure, e.g., an impregnated cloth structure; or (4) a highly-aligned array of parallel fibers randomly distributed normal to the fiber directions, e.g., a filament-wound structure, or a prepreg sheet consisting of parallel rows of fibers impregnated with a matrix.

Monolithic ceramic materials are known to exhibit certain desirable properties, including high strength and high stiffness at elevated temperatures, resistance to chemical and environmental attack, and low density. However, monolithic ceramics have one property that limits their use in stressed environments, namely their low fracture toughness. While significant advances have been made to improve the fracture toughness of monolithic ceramics, mostly through the additions of whisker and particulate reinforcements or through careful control of the microstructural morphology, they still remain extremely damage intolerant. More specifically, they are susceptible to thermal shock and will fail catastrophically when placed in severe stress applications. Even a small processing flaw or crack that develops in a stressed ceramic cannot redistribute or shed its load on a local scale. Under high stress or even mild fatigue, the crack will propagate rapidly resulting in catastrophic failure of the part in which it resides. It is this inherently brittle characteristic which can be even more pronounced at elevated temperatures, that has not allowed monolithic ceramics to be utilized in any safety-critical designs.

Research and development for these high temperature and high stress applications have focused on the development of continuous fiber reinforced ceramic matrix composites, hereafter referred to as CFCCs. The use of fiber reinforcements in the processing of ceramic and metal matrix composites is known in the prior art, and has essentially provided the fracture toughness necessary for ceramic materials to be developed for high stress, high temperature applications. See J. J. Brennan and K. M. Prewo, "High Strength Silicon Carbide Fiber Reinforced Glass-Matrix Composites," *J. Mater. Sci.*, 15 463–68 (1980); J. J. Brennan and K. M. Prewo, "Silicon Carbide Fiber Reinforced Glass-Ceramic Matrix Composites Exhibiting High Strength Toughness," i J. Mater. Sci., 17 2371–83 (1982); P. Lamicq, G. A. Gernhart, M. M. Danchier, and J. G. Mace, "SiC/SiC Composite Ceramics," *Am. Ceram. Soc. Bull.*, 65 [2] 336–38 (1986); T. I. Mah, M. G. Mendiratta, A. P. Katz, and K. S. Mazdiyasni, "Recent Developments in Fiber-Reinforced High Temperature Ceramic Composites," *Am. Ceram. Soc. Bull.*, 66 [2] 304–08 (1987).; K. M. Prewo, "Fiber-Reinforced Ceramics: New Opportunities for Composite Materials," *Am. Ceram. Soc. Bull.*, 68 [2] 395–400 (1989); H. Kodama, H. Sakamoto, and T. Miyoshi, "Silicon Carbide Monofilament-Reinforced Silicon Nitride or Silicon Carbide Matrix Composites," *J. Am. Ceram. Soc.*, 72 [4] 551–58 (1989); and J. R. Strife, J. J. Brennan, and K. M. Prewo, "Status of Continuous Fiber-Reinforced Ceramic Matrix Composite Processing Technology," *Ceram. Eng. Sci. Proc.*, 11 [7–8] 871–919 (1990).

Under high stress conditions, the fibers are strong enough to bridge the cracks which form in the ceramic matrix allowing the fibers to ultimately carry the load, and catastrophic failure can be avoided. This type of behavior has led to a resurgence of CFCCs as potential materials for gas turbine components, such as combustors, first-stage vanes, and exhaust flaps. See D. R. Dryell and C. W. Freeman, "Trends in Design in Turbines for Aero Engines," pp. 38–45 in *Materials Development in Turbo-Machinery Design;* 2nd Parsons International Turbine Conference, Edited by D. M. R. Taplin, J. F. Knott, and M. H. Lewis, The Institute of Metals, Parsons Press, Trinity College, Dublin, Ireland, 1989. CFCCs have also been given serious consideration for heat exchangers, rocket nozzles, and the leading edges of next-generation aircraft and reentry vehicles. See M. A. Karnitz, D. F. Craig, and S. L. Richlin, "Continuous Fiber Ceramic Composite Program," *Am. Ceram. Soc. Bull.*, 70 [3] 430–35 (1991), and *Flight Vehicle Materials, Structures and Dynamics—Assessment and Future Directions,* Vol. 3, edited by S. R. Levine, American Society of Mechanical Engineers, New York, 1992. In addition, CFCCs with a high level of open porosity are currently being utilized as filters for hot-gas cleanup in electrical power generation systems, metal refining, chemical processing, and diesel exhaust applications. See L. R. White, T. L. Tompkins, K. C. Hsieh, and D. D. Johnson, "Ceramic Filters for Hot Gas Cleanup," *J. Eng. for Gas Turbines and Power,* Vol. 115, 665–69 (1993).

CFCCs are currently fabricated by a number of techniques. The simplest and most common method for their fabricating has been the slurry infiltration technique whereby a fiber or fiber tow is passed through a slurry containing the matrix powder; the coated fiber is then filament wound to create a "prepreg"; the prepreg is removed, cut, oriented, and laminated into a component shape; and the part undergoes binder pyrolysis and a subsequent firing cycle to densify the matrix. See J. J. Brennan and K. M. Prewo, "High Strength Silicon Carbide Fibre Reinforced Glass-Matrix Composites," *J. Mater. Sci.,* 15 463–68 (1980); D. C. Phillips, "Fiber Reinforced Ceramics," Chapter 7 in *Fabrication of Composites,* edited by A. Kelly and S. T. Mileiko, North-Holland Publishing Company, Amsterdam, The Netherlands, 1983; and K. M. Prewo and J. J. Brennan, "Silicon Carbide Yarn Reinforced Glass Matrix Composites," *J. Mater. Sci.,* 17 1201–06 (1982).

Other techniques for fabricating CFCCs also typically involve an infiltration process in order to incorporate matrix material within and around the fiber architecture, e.g. a fiber tow, a preformed fiber mat, a stack of a plurality of fiber mats, or other two dimensional (2D) or three dimensional (3D) preformed fiber architecture. These techniques include the infiltration of sol-gels. See J. J. Lannutti and D. E. Clark, "Long Fiber Reinforced Sol-Gel Derived Alumina Composites", pp. 375–81 in *Better Ceramics Through Chemistry,* Material Research Society Symposium Proceedings, Vol. 32, North-Holland, New York, 1984; E. Fitzer and R. Gadow, "Fiber Reinforced Composites Via the Sol-Gel Route", pp. 571–608 in Tailoring Multiphase and Composite Ceramics, Materials Science Research Symposium Proceedings, Vol. 20, edited by R. E. Tressler et al., Plenum Press, New York, 1986. Other techniques include polymeric precursors which are converted to the desired ceramic matrix material through a post-processing heat treatment. See J. Jamet, J. R. Spann, R. W. Rice, D. Lewis, and W. S. Coblenz, "Ceramic-Fiber Composite Processing via Polymer-Filler Matrices," *Ceram. Eng. Sci. Proc.,* 5 [7–8] 677–94 (1984); and K. Sato, T. Suzuki, O. Funayama, T. Isoda, "Preparation of Carbon Fiber Reinforced Composite by Impregnation with Perhydropolysilazane Followed by Pressureless Firing," *Ceram. Eng. Sci. Proc.,* 13 [9–10] 614–21 (1992).

Other research and development has involved molten metals that are later nitrided or oxidized. See M. S. Newkirk, A. W. Urquhart, H. R. Zwicker, and E. Breval, "Formation of Lanxide Ceramic Composite Materials," *J. Mater. Res.,* 1 81–89 (1986); and M. K. Aghajanian, M. A. Rocazella, J. T. Burke, and S. D. Keck, "The Fabrication of Metal Matrix Composites by a Pressureless Infiltration Technique," *J. Mater. Sci.,* 26 447–54 (1991). Other research and development has involved molten materials that are later carbided to form a ceramic matrix. See R. L. Mehan, W. B. Hillig, and C. R. Morelock, "Si/SiC Ceramic Composites: Properties and Applications," *Ceram. Eng. Sci. Proc.,* 1 405 (1980). Still other research and development has involved molten silicates that cool to form a glass or glass-ceramic matrix (see M. K. Brun, W. B. Hillig, and H. C. McGuigan, "High Temperature Mechanical Properties of a Continuous Fiber-Reinforced Composite Made by Melt Infiltration," *Ceram. Eng. Sci. Proc.,* 10 [7–8] 611–21 (1989)), and chemical vapors which decompose and condense to form the ceramic matrix (See A. J. Caputo and W. J. Lackey, "Fabrication of Fiber-Reinforced Ceramic Composites by Chemical Vapor Infiltration," *Ceram. Eng. Sci. Proc.,* 5 [7–8] 654–67 (1984); and A. J. Caputo, W. J. Lackey, and D. P. Stinton, "Development of a New, Faster, Process for the Fabrication of Ceramic Fiber-Reinforced Ceramic Composites by Chemical Vapor Infiltration," *Ceram. Eng. Sci. Proc.,* 6 [7–8] 694–706 (1985).

Two U.S. patents have issued which involve a method for the fabrication of a fiber reinforced composite by combining an inorganic reinforcing fiber with dispersions of powdered ceramic matrix in organic vehicles, such as thermoplastics. The first patent, U.S. Pat. No. 5,024,978, discloses a method for making an organic thermoplastic vehicle containing ceramic powder that can form the matrix of a fiber reinforced composite. This patent also discloses that the ceramic powder/thermoplastic mixtures can be heated to above the melt transition temperature of the thermoplastic and then applied as a heated melt to an inorganic fiber. This patent further discloses that the process may be used to make composite ceramic articles. The second patent, U.S. Pat. No. 5,250,243, discloses a method for applying a dispersion of ceramic powder in a wax-containing thermoplastic vehicle to an inorganic fiber reinforcement material to form a prepreg material such as a prepreg tow. This patent further discloses that the prepreg tow may be subjected to a binder pyrolysis step to partially remove the wax binder vehicle prior to consolidation of the prepreg tow into the preform of a composite ceramic article.

To summarize, the continuous fiber reinforced ceramic composites ("CFCCs") prior to the present invention have traditionally been fabricated using methods and apparatuses to infiltrate the matrix or matrix-forming material around a preformed architecture of dense fibers or fiber tows or by passing the fibers through a powder/melt slurry. While these methods and apparatuses provide a fiber reinforced composite structure, there is no control over the thickness of the matrix forming vehicle, and rarely will the matrix uniformly surround the fibers. In such methods, the fibers often contact each other which is detrimental to the mechanical behavior of such composites. In addition, these infiltration processes are quite slow, sometimes requiring weeks or months to fabricate components, and are severely limited in the matrix/fiber combinations that can be produced.

Thus, there exists a need for more efficient methods and apparatuses for applying the matrix to the fiber reinforcement. There exists a further need for methods and apparatuses that are versatile enough to allow almost limitless combinations of matrix and fiber reinforcement.

It is therefore an object of the present invention to provide methods and apparatuses for efficient fabrication of ceramic composites that exhibit non-catastrophic behavior when used as a fiber reinforcement for a green ceramic matrix.

Another object of the present invention is to provide relatively efficient methods and apparatuses for applying the green matrix material to the fiber reinforcement such that it completely surrounds the fiber reinforcement prior to composite layup.

A further object of the present invention is to provide relatively efficient methods and apparatuses for preparing and applying the green matrix material to the fiber reinforcement, regardless of the composition from which the matrix is prepared or the composition of the fiber reinforcement.

Yet another object of the present invention is to provide relatively efficient methods and apparatuses for preparing both a green ceramic matrix and a green matrix/fiber interfacial layer that can be applied to the fiber reinforcement regardless of the composition of the matrix, interface, or fiber reinforcement.

These and other objects and advantages of the present invention, as well as additional inventive features, will be apparent to those of skill in the art from the description of the invention provided herein.

SUMMARY OF THE INVENTION

The present invention comprises novel continuous composite coextrusion methods and apparatus for fabricating fiber reinforced composite materials. Specifically, the present invention comprises novel methods and apparatus to fabricate composite materials via an economical, versatile, and controlled continuous composite coextrusion processes. In a particular preferred embodiment of the present invention, a dense fiber or dense fiber tow (bundles of fibers) is introduced during melt extrusion of a ceramic (or metal)/ binder feed-rod. The result of this coextrusion process is a coextruded "green" filament containing an in-situ dense fiber or tow of fibers.

More specifically, the present invention relates to processes for the fabrication of a fiber reinforced composite, i.e., a composite which is comprised of a matrix of a material, such as a ceramic or metallic material, and having fibers of a ceramic material dispersed within the matrix as a reinforcement. A preferred method of the present invention comprises: (a) forming a material-laden composition comprising a thermoplastic polymer and at least about 40 volume % of a ceramic or metallic particulate in a manner such that the composition has a substantially cylindrical geometry and thus can be used as a substantially cylindrical feed rod; (b) forming a hole down the symmetrical axis of the feed rod; (c) inserting the start of a continuous spool of ceramic fiber, metal fiber or carbon fiber through the hole in the feed rod; (d) extruding the feed rod and fiber reinforcement simultaneously to form a continuous filament consisting of a "green" matrix material completely surrounding a dense fiber reinforcement and said filament having an average diameter that is less than the average diameter of the feed rod; and (e) arranging the continuous filament into a desired architecture to provide a green fiber reinforced composite. The green matrix may be subsequently fired, i.e., heated, to provide a fiber reinforced composite with non-brittle failure characteristics.

The present invention also provides a process for the fabrication of a fiber reinforced composite having an interlayer, i.e., a composite that is comprised of a matrix of material, such as a ceramic or metallic material, having fibers of a ceramic material dispersed within the matrix as a reinforcement, and having an interlayer that is between the matrix and fiber reinforcement. This method is the same as that described in the preceding paragraph, but further comprises forming a feed rod that contains two dissimilar particulate-laden compositions wherein during the extrusion process the second particulate-laden composition forms a green interlayer between the fiber reinforcement and the green matrix in a continuous filament. This filament can be arranged as described in the previous paragraph and both the green interlayer and the green matrix may be subsequently fired to provide a fiber reinforced composite having substantially improved non-brittle failure characteristics compared to a fiber reinforced composite in the absence of an interlayer.

The present invention further provides methods for the fabrication of continuous filaments used in preparing fiber reinforced composites wherein the architecture of the filaments can be readily controlled.

Yet another aspect of the present invention is the ability to take the continuous filaments and form a shaped green-body. Typically, the extruded filament is molded by pressing into an appropriate mold at temperature of at least about 80° C. The molding operation joins the fiber reinforced green filaments together, creating a solid, shaped green body. Any shape that can be compression molded or otherwise formed by plastic deformation can be obtained with extruded filament. The green body so molded has the desired texture created by the arrangement of the extruded filaments. For example, a uniaxially aligned fiber reinforced composite can be obtained by a uniaxial lay-up of the extruded filaments prior to molding, or a woven architecture can be obtained by molding a shape from previously woven extruded filaments. The extruded filament product permits a wide variety of composite architectures to be fabricated in a molded green body.

In a preferred method of the present invention, a co-axial filament is produced with a fiber tow surrounded by a "green" ceramic. In a further preferred embodiment of the present invention, the process has been demonstrated utilizing carbon fiber tows in a hafnium carbide ("HfC") matrix and the resulting product can be used in extreme high temperature environments. The fiber imparts the necessary thermal shock resistance and toughness that HfC lacks as a monolithic ceramic.

The processing techniques of the invention readily allows for control of the fiber volume fraction and changes to the matrix composition. This technology is readily applicable to other matrix/fiber combinations and will significantly enhance manufacturing capability for low cost, high-performance and high temperature ceramic composites.

DETAILED DESCRIPTION OF PREFERRED EMBODIMENTS

Figure 1:
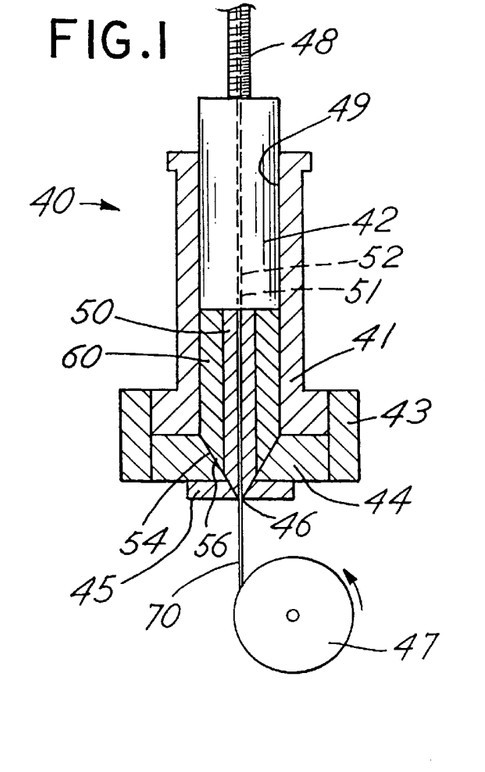
FIG. 1 illustrates a cross-section of a preferred apparatus of the present invention.

FIG. 1 illustrates a cross-section of a preferred apparatus of the present invention. The apparatus 40 is an extrusion die comprising an extrusion barrel 41, an extrusion ram 42, a heating jacket 43, a transition block 44, a spinnerette 45, an extrusion orifice 46, and a motor driven winding spool 47, a motor driven ram screw 48, and an inlet 49.

Figure 4:
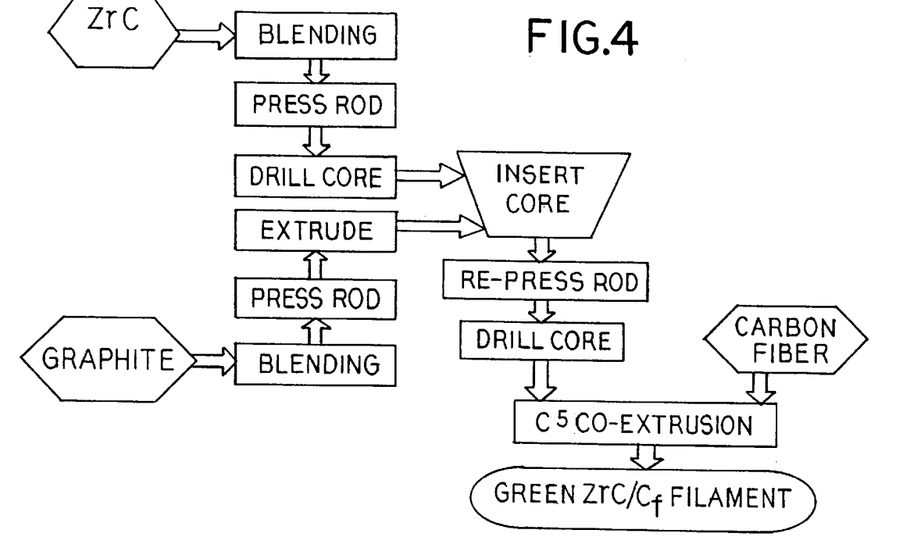
FIG. 4 is flow chart illustrating a preferred method of the present invention.

FIG. 4 depicts a flow chart of a preferred method of the present invention. In accordance with a preferred method and apparatus of the present invention, as shown in FIGS.

1—3, a graphite rod or graphite interface layer 50 can be prepared by blending graphite material and pressing the graphite material into a rod shape. In addition, a matrix feedrod 60 can be prepared by blending a suitable matrix feedrod material, pressing the matrix feedrod material into a rod shape, and drilling a core hole 61 through the longitudinal axis of the matrix feedrod 60. The core hole 61 should have a diameter just large enough for the insertion of the graphite rod 50 there through.

Figure 2:
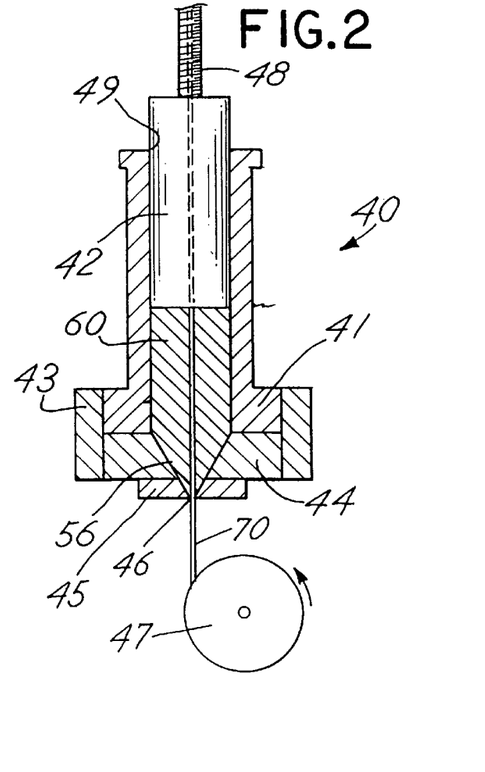
FIG. 2 illustrates a cross-section of another preferred apparatus of the present invention.
Figure 3A:
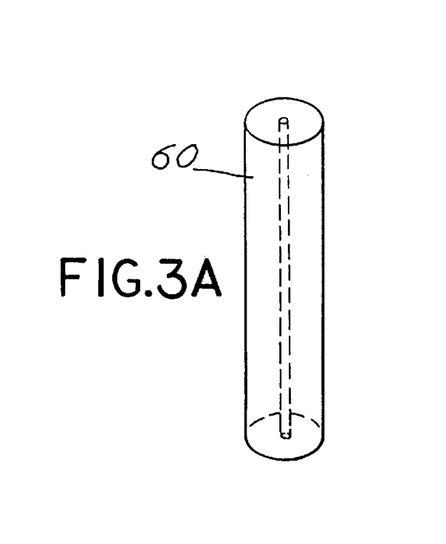
FIGS. 3A and 3B are schematic illustrations respectively of the matrix feedrod with and without the graphite interface feedrod in accordance with the present invention.
Figure 3B:
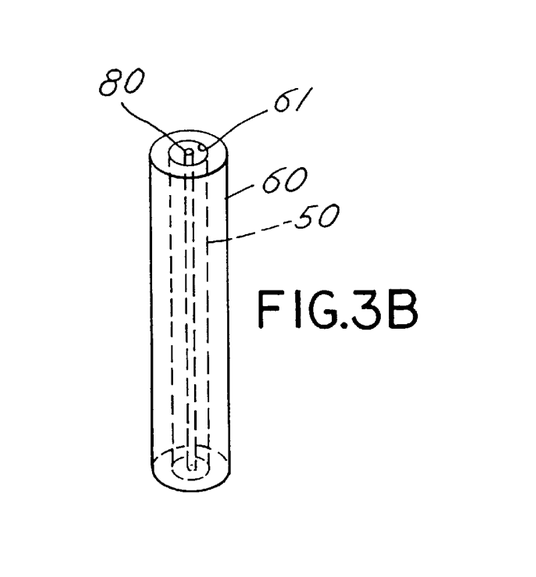

The blending steps for the matrix feedrod 60 and graphite rod 50 as shown in FIG. 1–3 can comprise milling and batching of matrix feedrod and graphite powders individually with thermoplastic binders and additives in a mixer, e.g., a Brabender Plasticorder high shear mixer. In a preferred embodiment, the matrix feedrod material comprises hafnium carbide ("HfC") or zirconium carbide ("ZrC"). Preferably the carbide powder/thermoplastic blend is pressed into a "green" rod having a diameter of about 0.885 inches, i.e., about 2.248 cm.

After preparation of the matrix feedrod 60 and the graphite rod 50, graphite rod 50 can then be inserted into and through core hole 61 of matrix feedrod 60. If desired, graphite rod 50 and surrounding matrix feedrod 60 can then be repressed to maintain their rod shapes. A cylindrical hole 80 can next be drilled through the longitudinal axis of graphite rod 50. In a preferred embodiment, cylindrical hole 80 has a diameter of about 0.125 inches, i.e., 0.318 cm.

The resulting combination of graphite rod 50 and surrounding matrix feedrod 60 can then be inserted into inlet 49 and extrusion barrel 41, until it stops at location 54. If desired, a guide tube 20, an example of which is shown in detail in FIG. 6, can be inserted through cylindrical hole 80, as shown in FIG. 3B.

Figure 6:
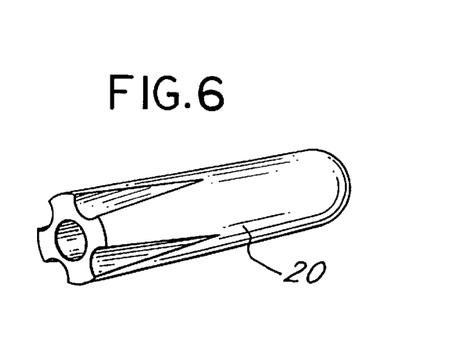
FIG. 6 is a perspective view of a guide tube that may be used in the apparatus shown in FIG. 2.

Extrusion ram 42 can next be placed on top of the combination of graphite rod 50 and surrounding matrix feedrod 60. Extrusion ram 42 has a bore 52 having a diameter of sufficient size to receive the carbon fiber tow 51 and slide over the guide tube 20, if such guide tube is used (as shown in FIG. 6).

Carbon fiber tow 51 can then be inserted through bore 52 of extrusion ram 42 and cylindrical hole 80 of graphite rod 50, until the inserted end reaches extrusion orifice 46.

As shown in FIGS. 1–2, heating jacket 43 heats the matrix feedrod 60 to melt the matrix feedrod material. Extrusion ram 42 pushes the matrix feedrod 60 through heating jacket 43 to the soften zone 56. Preferably, soften zone 56 has a frusto-conical shape, with the extrusion orifice 46 located at the bottom of soften zone 56.

Co-axial filament 70 is extruded from extrusion orifice 46 and wound on the motor driven spinnerette or winding spool 47. As shown in FIG. 1, co-axial filament 70 thus comprises carbon fiber tow 51, surrounded by graphite rod or graphite interface layer 50 and matrix feedrod 60. Co-axial filament 70 can also be called a green $ZrC/C_F$ filament, if ZrC is used as the matrix feedrod material, and the tow comprises a carbon fiber material.

Figure 5A:
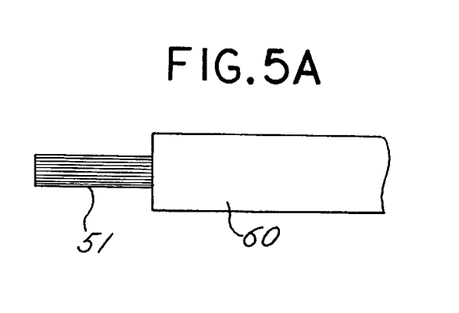
FIG. 5B is a schematic illustration of a "green" coaxial filament with a graphite interface layer and FIG. 5A is a schematic illustration of a "green" coaxial filament without a graphite interface layer in accordance with the present invention.
Figure 5B:
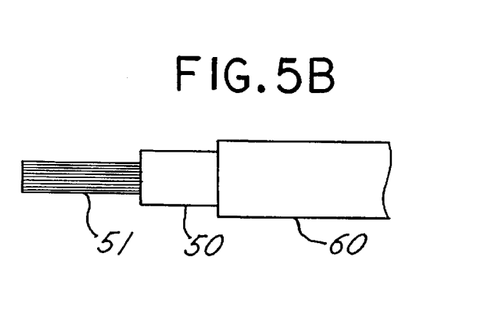

The graphite interface layer 50 surrounding the carbon fiber tow 51 as shown in FIG. 5B has been found to reduce and eliminate matrix cracking in composites caused by the large CTE mismatch between the matrix feedrod and the fiber materials. By pressing the graphite rods to different diameters, the graphite interface layer 50 can be varied as desired.

Notably, the carbon fiber tow 51 is centered in the green co-axial filament 70. Design choices to achieve the desired product include varying the viscosities of ZrC powder/thermoplastic and graphite powder/thermoplastic blends, eliminating the guide tube 20, and changing the composite fiber extrusion conditions. These choices can lead to a uniform interfacial coating.

FIG. 4 is a flow chart illustrating a preferred method of the present invention.

FIG. 5B is a schematic illustration of a "green" coaxial filament with a graphite interface layer and FIG. 5A is a schematic illustration of a "green" coaxial filament without a graphite interface layer in accordance with the present invention.

FIG. 6 is a perspective view of a guide tube that may be used in the apparatus shown in FIG. 2.

Figure 7:
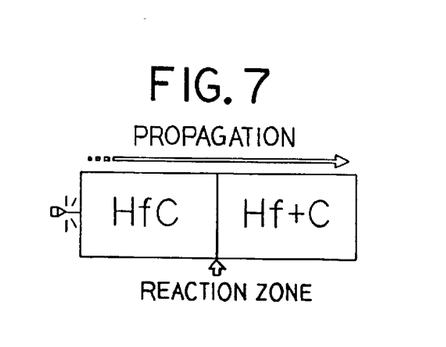
FIG. 7 illustrates the self-propagating, high temperature synthesis for producing hafnium carbide matrix.

FIG. 7 illustrates the self-propagating, high temperature synthesis for producing hafnium carbide matrix.

Figure 8:
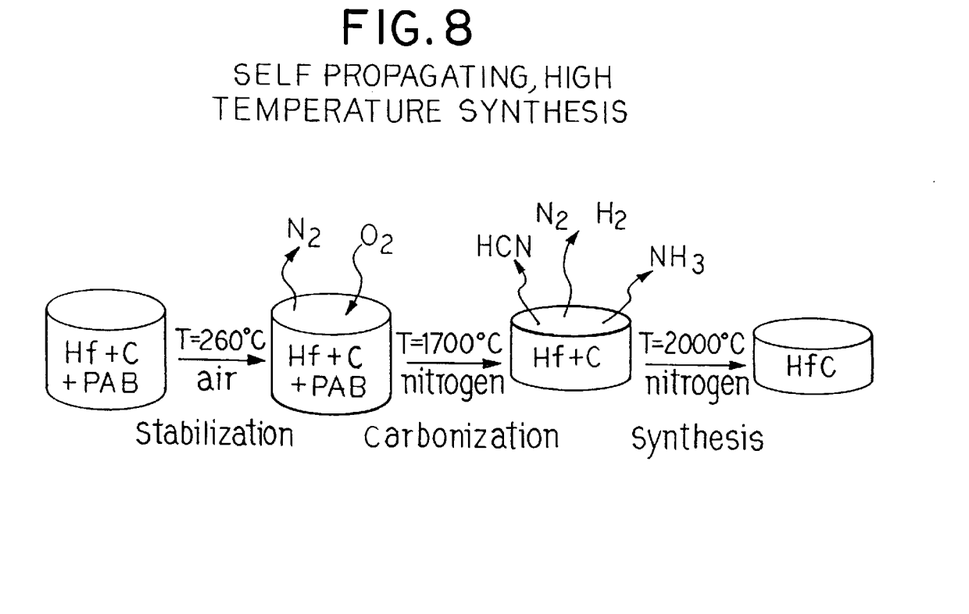
FIG. 8 further illustrates the self-propagating, high temperature synthesis method using poly(acrylonitrile-co-butadiene), i.e., "PAB", for producing hafnium carbide matrix.

FIG. 8 further illustrates the self-propagating, high temperature synthesis method using poly(acrylonitrile-co-butadiene), i.e., "PAB", for producing hafnium carbide matrix.

Figure 9:
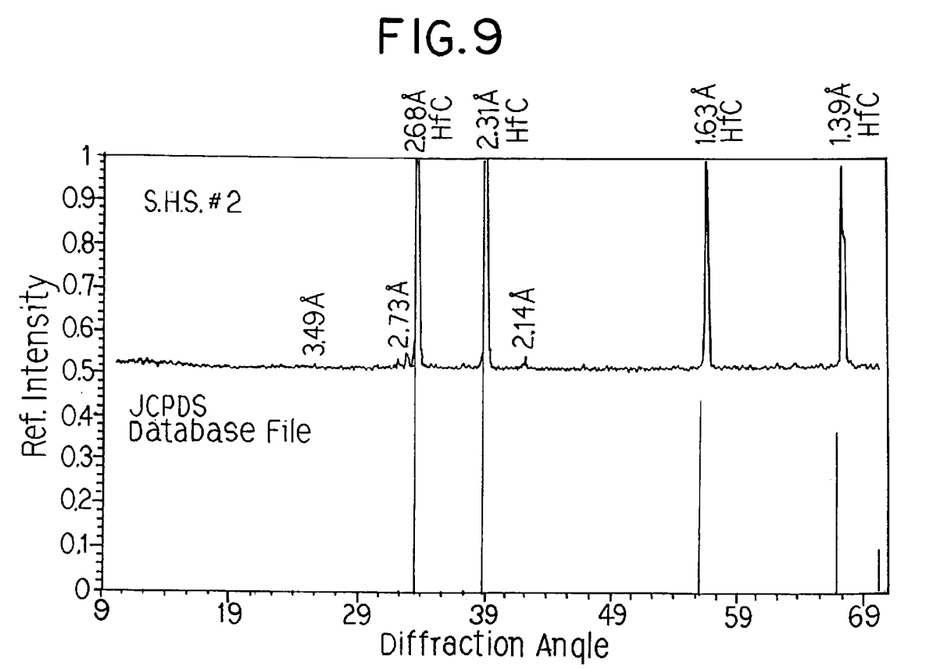
FIG. 9 illustrates the x-ray diffraction of the reaction of hafnium and carbon using PAB.

FIG. 9 illustrates the x-ray diffraction of the reaction of hafnium and carbon using PAB.

A wide variety of fibers can be used in accordance with the present invention. The type of fiber to use is a design choice, as are types of fiber tows. For example, ceramic fibers can comprise silicon carbide, and metal fibers can comprise tungsten, tantalum, steel, aluminum, and copper fibers. In choosing a fiber tow, factors to consider include fiber tow diameter, tow strength, tow elastic modulus, and the coefficient of thermal expansion (CTE). Three examples of fibers that can be used in accordance with the present invention are as follows in Table 1:

TABLE 1

| | | Carbon Fiber Tow Properties | | | |
|---|---|---|---|---|---|
| Supplier | Fiber Type | Tow Diameter (mm) | Tensile Strength GPa (ksi) | Tensile Modulus GPa (Msi) | Axial CTE ppm/K |
| Hexcel | AS4 3K | 0.387 | 5.93 (570) | 221 (32) | −0.7 |
| Hexcel | UHMS-G 3K | 0.242 | 3.48 (500) | 441 (64) | −0.5 |
| Amoco | T-300 3K | 0.393 | 3.65 (530) | 231 (33.5) | −0.6 |

The above fibers from Hexcel comprise polyacrylonitrile ("PAN"). The above fiber from Amoco comprises a petroleum extract, referred to as "pitch."

The starting carbon fiber tow diameter is a factor in determining the fiber volume fraction of final composite parts. The tow strength and tow stiffness governs mechanical properties such as flexural and tensile strength in the final composite. The CTE of the fiber will determine the compatibility of the fiber/matrix and the size/type of interface.

The reported CTE value of the ZrC matrix is 6.9 ppm/K, while axial CTE of carbon fiber is less than 0 ppm/K. In order to minimize this CTE mismatch, a graphite interfacial coating is placed between the carbon fiber and ZrC matrix during co-extrusion.

The wound up co-axial filament can be weaved and/or laid up into a part. The part can then be laminated by heating and/or squeezing out the thermoplastic. The part can then be placed into a furnace and subjected to heat to burn out any remaining thermoplastic. The resulting product of these steps is a co-axial filament having a carbon fiber tow, a graphite interface, and a matrix, and thus comprises a fiber reinforced matrix composite.

The fiber reinforced matrix composite can be further consolidated using any suitable method, including but not limited to, hot pressing, hot isostatic pressing, pressureless sintering, and self propagating high temperature synthesis, all of which are known to those skilled in the art. The consolidation step is to form a fully dense fiber reinforced composite.

Pressureless sintering can be an alternative to the consolidation of composites by hot pressing. In a typical uniaxial hot-pressing process, the monolithic ceramic or composite is consolidated in a graphite die at high temperatures and pressures. While this process is amenable to the production of two-dimensional parts, it is often difficult to produce complicated three-dimensional parts. Also, the uniaxial hot-pressing process is typically not a high volume manufacturing process since only few samples can be pressed in a single run.

In pressureless sintering processes, samples are heated to high temperatures without high pressure in a large volume, high temperature furnace. This allows the production of complex three-dimensional parts in large quantities. Thus, the development of a pressureless sintering process can lead to low cost, fully dense composite parts.

ZrC may be pressureless sintered using sintering additives, for example, zirconium metal. The following examples show the density and flexural strength of composites wherein the consolidation was accomplished by pressureless sintering.

EXAMPLE 1

NCE-BR01
Description: Core Material
Brabender Size: small
Batch Size: 42 cc
Batch Temperature: 150° C.
Batch Speed: 60 rpm
Ingredients

| Material | Density (g/cc) | Volume % | Volume (cc) | Weight (g) |
|---|---|---|---|---|
| ZrC (10% SiC) | 6.35 | 53.65% | 22.53 | 143.08 |
| EEA | 0.93 | 30.00% | 12.60 | 11.72 |
| Wax | 0.92 | 3.75% | 1.58 | 1.45 |
| B-67 | 1.06 | 5.27% | 2.23 | 2.35 |
| Butyl Oleate | 0.87 | 7.33% | 3.09 | 2.69 |

NCE-BR02
Description: Graphite Interlayer Material
Brabender Size: small
Batch Size: 42 cc
Batch Temperature: 150° C.
Batch Speed: 60 rpm
Ingredients

| Material | Density (g/cc) | Volume % | Volume (cc) | Weight (g) |
|---|---|---|---|---|
| Graphite | 1.80 | 53.65% | 22.53 | 37.04 |
| EEA | 0.93 | 30.00% | 12.60 | 11.72 |
| Wax | 0.92 | 6.75% | 2.84 | 2.61 |
| B-67 | 1.06 | 5.27% | 2.23 | 2.35 |
| Butyl Oleate | 0.87 | 8.98% | 3.78 | 3.29 |

Thermal stresses and associated fractures were reduced in the production of relatively crack-free ZrC composites. Further reduction of thermal stresses and degradation of the carbon fibers was achieved during consolidation. This was accomplished by using Hexcel UHMS-G carbon fiber tow. It is believed that the higher elastic modulus of this fiber would help reduce the clamping forces on the fibers produced by the CTE mismatch and thereby eliminate microcracks. In addition, the fiber architecture was varied to better distribute the residual stresses. Two billets were prepared using ZrC (10 vol % SiC) powder.

In preparing the material-laden compounds used in the inventive methods, the raw material powders are typically blended with an organic polymer and, advantageously, one or more processing aids. Most thermoplastic polymers can be used in the compositions of the present invention, but preferred polymer systems are the highly flexible polymers and copolymers, advantageously ethylene polymers and copolymers, and preferably polyethylene, ethylene-ethyl acetate copolymers ("EEA") e.g., ELVAX 470, from E. I. Dupont Co., and acryloid resin, e.g., B-67, from Rohm and Haas.

A wide variety of powder ceramics may also be used in the material-laden compositions, affording a wide flexibility in the composition of the final fiber reinforced composite. Advantageously, powders which may be used in the first material-laden composition to provide the feed rod include ceramic oxides, ceramic carbides, ceramic nitrides, ceramic borides, ceramic suicides, metals, and intermetallics. Preferred powders for use in that composition include aluminum oxides, barium oxides, beryllium oxides, calcium oxides, cobalt oxides, chromium oxides, dysprosium oxides and other rare earth oxides, lanthanum oxides, magnesium oxides, manganese oxides, niobium oxides, nickel oxides, aluminum phosphate, yttrium phosphate, lead oxides, lead titanate, lead zirconate, silicon oxides and silicates, thorium oxides, titanium oxides and titanates, uranium oxides, yttrium oxides, yttrium aluminate, zirconium oxides and their alloys; boron carbides, iron carbides, hafnium carbides, molybdenum carbides, silicon carbides, tantalum carbides, titanium carbides, uranium carbides, tungsten carbides, zirconium carbides; aluminum nitrides, cubic boron nitrides, silicon nitrides, titanium nitrides, uranium nitrides, yttrium nitrides, zirconium nitrides; aluminum boride, hafnium boride, molybdenum boride, titanium boride, zirconium boride; molybdenum disilicide; magnesium and other alkali earth metals and their alloys; titanium, iron, nickel and other transition metals and their alloys; cerium, ytterbium and other rare earth metals and their alloys; aluminum; carbon; and silicon.

The process of the present invention can be accomplished using various suitable materials, such as ceramic powders (having different particle sizes), thermoplastics, and plasticizers. The present invention can also incorporate various modifications to various steps, including the steps of compounding, maling feed rods, passing the fiber/fiber tow through the feed rod, and using spinnerettes for extrusion.

Further, the present invention can be used to achieve more than one coating on a fiber/fiber tow (interlayers), and that the coated fibers/fiber tows of the present invention can be used to form fiber reinforced ceramic articles.

Among the materials that can be used in the present invention for a source of carbon in the self propagating high temperature synthesis process are:

Poly(arylacetylene) (PAA)
Phenolic Resin
Furfuryl Resin
Mesophase Pitch
Petroleum Pitch
Acrylonitrile
Poly(acrylonitril-co-butadiene)

Self-propagating, high temperature synthesis ("SHS") has been used in test batches of $Al_2O_3$ with:

Poly(acrylonitril-co-butadiene) ("PAB")
A-240 Petroleum pitch

After the tests showing suitable blending between $Al_2O_3$ and PAB, Hf/C was then blended with PAB as follows.

1. Hf/C with PAB, air stabilized
2. HF/C with PAB, air stabilized
3. HF/C with PAB, nitrogen pyrolysis, slow ramp
4. Hf/C with PAB, air stabilized, slow ramp wherein Hf/C is hafnium carbide matrix.

The continuous composite coextrusion process of the present invention has been used to make a hafnium carbide matrix/no interface/carbon fiber reinforcement, and to make a hafnium carbide matrix/graphite interface/carbon fiber reinforcement, as well as zirconium carbide and silicon carbide matrices with graphite interfaces and carbon fiber reinforcement.

The following examples further illustrate preferred embodiments of the present invention but are not be construed as in any way limiting the scope of the present invention as set forth in the appended claims.

EXAMPLE 1

Hafnium Carbide Matrix/No Interface/Carbon Fiber Reinforcement

VPCA-BR00
Description: Core Material
Brabender Size: small
Batch Size: 42 cc
Batch Temperature: 150° C.
Batch Speed: 60 rpm
Ingredients

| Material | Density (g/cc) | Volume % | Volume (cc) | Weight (g) |
|---|---|---|---|---|
| HfC | 12.67 | 54.0% | 22.66 | 287.36 |
| EEA | 0.93 | 32.4% | 13.608 | 12.66 |
| B-67 | 0.94 | 3.6% | 1.512 | 1.42 |
| HMO | 0.881 | 10.0% | 4.2 | 3.70 |

In the above-cited formulation, HfC is hafnium carbide powder from Cerac, Inc., designated as H-1004, B-67 is acryloid resin from Rohin and Haas, EEA is ethylene-ethyl acetate copolymers, and HMO is heavy mineral oil which is a plasticizer. A "Brabender" mixing machine (from C. W. Brabender of South Hackensack, N.J.) was used to mix the above-cited materials. The mixture of materials can then be formed into a feed rod with a hole through the symmetrical axis of the feed rod. After mixing, the mixture was formed into a feed rod-like shape like that shown in FIG. 1 and in detail in FIG. 3. The carbon fiber reinforcement can be inserted into the hole of the matrix as desired. Following coextrusion, the result is a "green" material that still contains binder, like that shown in FIG. 5. This green material can now be formed in a desired manner, such as a billet. The billet can then be subjected to lamination in a warm pressing operation to fill remaining voids, and the result is a green billet. The green billet can then be subjected to pyrolysis and then the resulting part can be hot pressed, hot isostatic pressed, or pressureless sintered to densify the matrix.

EXAMPLE 2

Hafnium Carbide Matrix/Graphite Interface/Carbon Fiber Reinforcement

The hafnium carbide matrix made in accordance with Example 1 is the same matrix for Example 2. The only difference in Example 2 is that the hole through the symmetrical axis of the feed rod is made larger so that a graphite interface can be inserted through the hole of the feed rod. The graphite interface defines a hole through its symmetrical axis, and the carbon fiber reinforcement can be inserted into the hole of the graphite interface, resulting in the product illustrated in FIG. 3. Following coextrusion, desired formation (such as a billet), lamination, pyrolysis, and firing as described in Example 1 and 2 the result is a fully dense composite formation. The formulation for the graphite interface is as follows.

VPCA-BR06
Description: Core Material
Brabender Size: small
Batch Size: 42 cc
Batch Temperature: 150° C.
Batch Speed: 60 rpm
Ingredients

| Material | Density (g/cc) | Volume % | Volume (cc) | Weight (g) |
|---|---|---|---|---|
| Graphite-4929 | 2.25 | 49.0% | 113.19 | 254.68 |
| EEA | 0.93 | 49.0% | 113.19 | 105.27 |
| MPEG-550 | 1.104 | 2.0% | 4.62 | 5.10 |

In the above formation, MPEG-550 is methoxy polyethylene glycol 550 (i.e., having an average molecular weight of 550). As previously noted, graphite interface has a hole through its symmetrical axis so that the carbon fiber reinforcement can be inserted through that axis as desired.

Various grades of materials can be used in accordance with the present invention, including various grades of HfC and graphite.

The present invention can be used to make other reinforcements, including but not limited to:

Zirconium Carbide Matrix/Graphite Interface/Carbon Fiber Reinforcement;
Zirconium Carbide Matrix/No Interface/Carbon Fiber Reinforcement or Silicon Carbide Reinforcement;
Silicon Carbide Matrix/No Interface/Carbon Fiber Reinforcement;
Hafnium Diboride Matrix/Graphite Interface/Carbon Fiber Reinforcement;
Silicon Carbide Matrix/Boron Nitride Interface/Silicon Carbide Reinforcement; and
Silicon Nitride Matrix/Boron Nitride Interface/Silicon Carbide Reinforcement.

The continuous composite coextrusion process of the present invention can be used to make a wide range of hafnium carbide matrix ("HfC") and $C_f$ ("carbon fiber reinforcement") products, including:

1. HfC/C$_f$ (25 vol. %), 18 μm carbon black interlayer
2. HfC/C$_f$ (25 vol. %), 32 μm carbon black interlayer.
3. HfC/C$_f$ (12.5 vol. %) 45 μm carbon black interlayer.

Thermal Expansion Considerations

| Material | CTE (× 10$^{-6}$ K$^{-1}$) |
|---|---|
| C$_f$ | −0.1 (axial) |
| HfC | 7.2–8.2* |
| TaC | 7.3 |
| HfB$_2$ | 7.9 |
| ZrB$_2$ | 8.2 |
| SiC | 5.8 |

*Coors Analytical Laboratory

To summarize, the continuous composite coextrusion process of the present invention can be used for ceramic matrix composites ("CMCs") and metal matrix composites ("MMCs"). Further, the use of interlayers helps to control stresses due to mismatches among the coefficients of thermal expansion ("CTE"), including those set forth above. Further, the present invention reduces microcracking. In addition, the self-propagating, high temperature synthesis is versatile, although it requires an additional densification step.

The present invention can be used for HfC/C$_f$ ("carbon fiber reinforced hafnium carbide matrix") continuous composite coextrusion process cylinders and processes; quantitative fiber volume loading effects; combinations of self-propagating, high temperature synthesis with continuous composite coextusion process; and HfC CVD ("chemical vapor deposition") coatings.

Many modifications and variations may be made in the techniques and structures described and illustrated herein without departing from the spirit and scope of the present invention. Accordingly, the techniques and structures described and illustrated herein should be understood to be illustrative only and not limiting upon the scope of the present invention.

What is claimed is:

1. A method for continuous composite coextrusion comprising:
    (a) forming a feed rod having a longitudinal axis and comprising a material-laden polymer composition comprising a thermoplastic polymer and at least about 40 volume % of a ceramic or metallic particulate material;
    (b) forming a hole down the longitudinal axis of the feed rod;
    (c) inserting the start of a continuous spool of ceramic fiber, metal fiber, or carbon fiber through the hole in the feed rod; and
    (d) extruding the feed rod and the spool simultaneously to form a continuous filament consisting of the material-laden polymer composition completely surrounding the fiber and said filament having an average diameter that is less than the average diameter of the feed rod.

2. The method of claim 1 including the further step of arranging the continuous filament into a desired architecture to provide a green fiber reinforced composite.

3. The method of claim 1 wherein the spool comprises a tow.

4. The method of claim 1 wherein the spool comprises a ceramic fiber comprising silicon carbide.

5. The method of claim 1 wherein the feed rod that is formed is substantially cylindrical.

6. The method of claim 1 further comprising the step of firing the filament to remove the thermoplastic polymer from the filament.

7. The method of claim 1 wherein the material-laden polymer composition comprises the group consisting of hafnium carbide, hafnium diboride, zirconium carbide, silicon carbide, or silicon nitride as the particulate.

8. A green reinforced composite formed from the method of claim 1.

9. A method for continuous composite coextrusion comprising:
    (a) forming a matrix feed rod having a longitudinal axis and comprising a first material-laden polymer composition comprising a thermoplastic polymer and at least about 40 volume % of a ceramic or metallic particulate material;
    (b) forming a hole down the longitudinal axis of the matrix feed rod;
    (c) inserting an interface feed rod having a longitudinal axis through the hole in the matrix feed rod, the interface feed rod comprising a second material-laden polymer composition that is different from the first material-laden polymer composition;
    (d) forming a hole down the longitudinal axis of the interface feed rod;
    (e) inserting the start of a continuous spool of ceramic fiber, metal fiber or carbon fiber through the hole in the interface feed rod; and
    (f) extruding the matrix feed rod, interface feed rod and the spool simultaneously to form a continuous filament consisting of the first material-laden polymer composition completely surrounding the second material-laden polymer composition, and the second material-laden composition completely surrounding the fiber, said filament having an average diameter that is less than the average diameter of the matrix feed rod.

10. The method of claim 9 including the further step of arranging the continuous filament into a desired architecture to provide a green fiber reinforced composite.

11. The method of claim 9 wherein the spool comprises a tow.

12. The method of claim 9 wherein the spool comprises a ceramic fiber comprising silicon carbide.

13. The method of claim 9 wherein the matrix feed rod that is formed is substantially cylindrical.

14. The method of claim 9 wherein the interface feed rod comprises graphite or boron nitride.

15. The method of claim 9 wherein the first material-laden polymer composition comprises the group consisting of hafnium carbide, hafnium diboride, zirconium carbide, silicon carbide, or silicon nitride as the particulate.

16. The green reinforced composite formed from the method of claim 9.

17. The green fiber reinforced composite of claim 16, the interface feed rod comprising material selected from the group consisting of graphite or boron nitride.

18. The green fiber reinforced composite of claim 16, the feed rod comprising material selected from the group consisting of hafnium carbide, hafnium diboride, zirconium carbide, silicon carbide, or silicon nitride.

19. The method of claim 9 farther comprising the step of firing the green reinforced composite to remove the thermoplastic polymer from the filament.

20. The product formed from the method of claim 19.

* * * * *